UNITED STATES PATENT OFFICE 2,602,066

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application September 5, 1950, Serial No. 183,291

11 Claims. (Cl. 252—342)

This invention relates to petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

One object of my invention is to provide a novel process for breaking or resolving emulsions of the kind referred to.

Another object of my invention is to provide an economical and rapid process for separating emulsions which have been prepared under controlled conditions from mineral oil, such as crude oil and relatively soft waters or weak brines. Controlled emulsification and subsequent demulsification under the conditions just mentioned, are of significant value in removing impurities particularly inorganic salts from pipeline oil.

Demulsification as contemplated in the present application includes the preventive step of commingling the demulsifier with the aqueous component which would or might subsequently become either phase of the emulsion, in absence of such precautionary measure. Similarly, such demulsifier may be mixed with the hydrocarbon component.

The demulsifying agent employed in the present process is a fractional ester obtained from a polycarboxyy acid and a diol obtained by the oxypropylation of dihydroxylated ethers of glycerol with the proviso that the ether radical in turn be free from any group having 8 or more carbon atoms and is preferably obtained from a water-soluble aliphatic alcohol but may be obtained from an alicyclic alcohol such as cyclohexanol or from a phenol such as hydroxybenzene or cresol.

A monohydric compound having less than 8 carbon atoms such as methyl alcohol, ethyl alcohol, propyl alcohol, allyl alcohol, butyl alcohol, phenol, methyl phenol, hexanol, methyl hexanol, cresol, benzyl alcohol, cyclohexyl methyl alcohol, tetrahydrofurfuryl alcohol, or tetrahydropyran-2-methanol, can be treated with several moles of ethylene oxide or propylene oxide to yield ether alcohols. Such ether alcohols can be treated with glycide to give ether diols of the kind herein employed as initial materials. Other well known procedures can be employed, as for example, such etherized monohydric alcohols can be reacted with epichlorohydrin in presence of caustic soda or as a subsequent step so as to reform the epoxy ring; such compound can then be subjected to reaction with water so as to rupture the epoxy ring. Other procedures employed in the preparation of glycerol ethers can be used also to prepare these particular etherized diols herein employed.

More specifically then the present invention is concerned with a process for breaking petroleum emulsions of the water-in-oil type characterized by subjecting the emulsion to the action of a demulsifier including hydrophile synthetic products; said hydrophile synthetic products being characterized by the following formula:

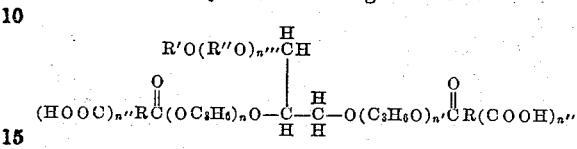

in which $n$ and $n'$ are numerals including zero, and $n'''$ is a small whole number less than 10, with the proviso that $n$ plus $n'$ plus $n'''$ equals a sum varying from 15 to 80 and $n''$ is a whole number not over 2; $R''$ is an alkylene radical having 2 to 3 carbon atoms, $R'$ is a hydrocarbon radical having less than 8 carbon atoms, and R is a radical of the polycarboxy acid

in which $n''$ has its previous significance; and with the further proviso that the parent diol prior to esterification be water-insoluble and kerosene-soluble.

Attention is directed to the co-pending application of C. M. Blair, Jr., Serial No. 70,811, filed January 13, 1949 (now Patent No. 2,562,898, dated August 7, 1951), in which there is described, among other things, a process for breaking petroleum emulsions of the water-in-oil type characterized by subjecting the emulsion to the action of an esterification product of a dicarboxylic acid and a polyalkylene glycol in which the ratio of equivalents of polybasic acid to equivalents of polyalkylene glycol is in the range of 0.5 to 2.0, in which the alkylene group has from 2 to 3 carbon atoms, and in which the molecular weight of the product is between 1,500 to 4,000.

Similarly, there have been used esters of dicarboxy acids and polypropylene glycols in which 2 moles of the dicarboxy acid ester have been reacted with one mole of a polypropylene glycol having a molecular weight, for example, of 2,000 so as to form an acidic fractional ester. Examination of what is said subsequently herein as well as the hereto appended claims in comparison with the previous example will show the line of delineation between such somewhat comparable compounds. Of greater significance, however, is what is said subsequently in regard to the structure of the parent diol as compared to polypropylene glycols whose molecular weights may vary from 1,000 to 2,000.

As previously stated it is my preference to employ derivatives in which the ether group is supplied by an aliphatic alcohol, preferably having at least 3 carbon atoms and being water-soluble, such as propyl alcohol, butyl alcohol, or amyl alcohol. In the case of butyl or amyl alcohols some of the isomers are water-soluble to the extent that they show solubility of at least a few percent at room temperature.

My preference, purely as a matter of convenience, is to obtain such etherized diols of the kind herein described from monohydric ether alcohols and glycide. Various monohydric ether alcohols suitable for reaction with glycide are available commercially. These include propyleneglycol methyl ether, dipropyleneglycol methyl ether, tripropyleneglycol methyl ether, propyleneglycol ethyl ether, dipropyleneglycol ethyl ether, tripropyleneglycol ethyl ether, propyleneglycol isopropyl ether, dipropyleneglycol isopropyl ether, tripropyleneglycol isopropyl ether, propyleneglycol n-butyl ether, dipropyleneglycol n-butyl ether, and tripropyleneglycol n-butyl ether. Similar compounds are available in which ethylene oxide radicals replace the propylene oxide radicals, and, similarly, one can readily prepare compounds in which a mixture of ethylene oxide and propylene oxide is used to react with one or more of the monohydric compounds previously mentioned, and particularly the alcohols, such as the water-soluble aliphatic alcohols. Reference to the hydrocarbon radical, of course, includes the variety of alcohols which contain an oxygen atom as in the case of tetrahydrofurfuryl alcohol, tetrahydropyran-2-methanol, etc., for the reason that the presence of the oxygen atom does not detract from the characteristic property imparted by the presence of a hydrocarbon radical. Reference to R' in the specification and the claims as being a hydrocarbon radical of course includes such radicals as those derived from these last two alcohols.

For convenience, what is said hereinafter will be divided into five parts:

Part 1 is concerned with the preparation of the oxypropylation derivatives of the glycerol ether type of diol;

Part 2 is concerned with the preparation of the esters from the oxypropylated derivative;

Part 3 is concerned with a consideration of the structure of the glycerol ether type of diols which is of significance in light of what is said subsequently.

Part 4 is concerned with the use of the products herein described as demulsifiers for breaking water-in-oil emulsions; and Part 5 is concerned with certain derivatives which can be obtained from the oxypropylated diols. In some instances, such derivatives are obtained by modest oxyethylation preceding the oxypropylation step, or oxypropylation followed by oxyethylation. This results in diols having somewhat different properties which can then be reacted with the same polycarboxy acids or anhydrides described in Part 2 to give effective demulsifying agents. For this reason a description of the apparatus makes casual mention of oxyethylation. For the same reason there is brief mention of the use of glycide.

PART 1

For a number of well known reasons equipment, whether laboratory size, semi-pilot plant size, pilot plant size, or large scale size, is not as a rule designed for a particular alkylene oxide. Invariably and inevitably, however, or particularly in the case of laboratory equipment and pilot plant size the design is such as to use any of the customarily available alkylene oxide, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions, not only in regard to presence or absence of catalyst, and the kind of catalyst, but also in regard to the time of reaction, temperature of reaction, speed of reaction, pressure during reaction, etc. For instance, oxyalkylations can be conducted at temperatures up to approxiamtely 200° C. with pressures in about the same range up to about 200 pounds per square inch. They can be conducted also at temperatures approximating the boiling point of water or slightly above, as for example 95° to 120° C. Under such circumstances the pressure will be less than 30 pounds per square inch unless some special procedure is employed as is sometimes the case, to wit, keeping an atmosphere of inert gas such as nitrogen in the vessel during the reaction. Such low-temperature–low reaction rate oxypropylations have been described very completely in U. S. Patent No. 2,448,664, to H. R. Fife et al., dated September 7, 1948. Low temperature, low pressure oxypropylations are particularly desirable where the compound being subjected to oxypropylation contains one, two or three points of reaction only, such as monohydric alcohols, glycols and triols.

Since low pressure–low temperature reaction speed oxypropylations require considerable time, for instance, 1 to 7 days of 24 hours each to complete the reaction they are conducted as a rule whether on a laboratory scale, pilot plant scale, or large scale, so as to operate automatically. The prior figure of seven days applies especially to large-scale operations. I have used conventional equipment with two added automatic features: (a) a solenoid controlled valve which shuts off the propylene oxide in event that the temperature gets outside a predetermined and set range, for instance, 95° to 120° C., and (b) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various examples I have found it particularly advantageous to use laboratory equipment or pilot plant which is designed to permit continuous oxyalkylation whether it be oxypropylation or oxyethylation. With certain obvious changes the equipment can be used also to permit oxyalkylation involving the use of glycide where no pressure is involved except the vapor pressure of a solvent, if any, which may have been used as a diluent.

As previously pointed out the method of using propylene oxide is the same as ethylene oxide. This point is emphasized only for the reason that the apparatus is so designed and constructed as to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement as far as propylene oxide goes unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet; pressure gauge, manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and, preferably, coils in addition thereto, with the jacket so arranged that it is suitable for heating with steam or cooling with water and further equipped with electrical heating devices. Such autoclaves are, of course, in essence small-scale replicas of the usual conventional autoclave used in oxyalkylation procedures. In some instances in exploratory preparations an autoclave having a smaller capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves, the container consists essentially of a laboratory bomb having a capacity of about one-half gallon, or somewhat in excess thereof. In some instances a larger bomb was used, to wit, one having a capacity of about one gallon. This bomb was equipped, also, with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required, any other usual conventional procedure or addition which provided greater safety was used, of course, such as safety glass protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform in that the reaction temperature was held within a few degrees of any selected point, for instance, if 105° C. was selected as the operating temperature the maximum point would be at the most 110° C. or 112° C., and the lower point would be 95° or possibly 98° C. Similarly, the pressure was held at approximately 30 pounds within a 5-pound variation one way or the other, but might drop to practically zero, especially where no solvent such as xylene is employed. The speed of reaction was comparatively slow under such conditions as compared with oxyalkylations at 200° C. Numerous reactions were conducted in which the time varied from one day (24 hours) up to three days (72 hours), for completion of the final member of a series. In some instances the reaction may take place in considerably less time, i. e., 24 hours or less, as far as a partial oxypropylation is concerned. The minimum time recorded was about a 3-hour period in a single step. Reactions indicated as being complete in 10 hours may have been complete in a lesser period of time in light of the automatic equipment employed. This applies also where the reactions were complete in a shorter period of time, for instance, 4 to 5 hours. In the addition of propylene oxide, in the autoclave equipment as far as possible the valves were set so all the propylene oxide if fed continuously would be added at a rate so that the predetermined amount would react within the first 15 hours of the 24-hour period or two-thirds of any shorter period. This meant that if the reaction was interrupted automatically for a period of time for pressure to drop or temperature to drop the predetermined amount of oxide would still be added in most instances well within the predetermined time period. Sometimes where the addition was a comparatively small amount in a 10-hour period there would be an unquestionable speeding up of the reaction, by simply repeating the examples and using 3, 4, or 5 hours instead of 10 hours.

When operating at a comparatively high temperature, for instance, between 150° to 200° C., an unreacted alkylene oxide such as propylene oxide, makes it presence felt in the increase in pressure or the consistency of a higher pressure. However, at a low enough temperature it may happen that the propylene oxide goes in as a liquid. If so, and if it remains unreacted there is, of course, an inherent danger and appropriate steps must be taken to safeguard against this possibility; if need be a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature even in large scale operations as much as a week or ten days time may lapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction the scale movement through a time operating device was set for either one to two hours so that reaction continued for 1 to 3 hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point as previously set out. All the points of design, construction, etc., were conventional including the gases, check valves and entire equipment. As far as I am aware at least two firms, and possibly three, specialize in autoclave equipment such as I have employed in the laboratory, and are prepared to furnish equipment of this same kind. Similarly pilot plant equipment is available. This point is simply made as a precaution in the direction of safety. Oxyalkylations, particularly involving ethylene oxide, glycide, propylene oxide, etc., should not be conducted except in equipment specifically designed for the purpose.

Actually oxypropylations of diols of various kinds can be conducted in all sizes of equipment, and the only matters involved are (a) convenience, (b) economy, and (c) the fact that the actual molecular weight based on the hydroxyl number drops off rapidly from the theoretical molecular weight, based on the assumption of complete reaction. This applies to substantially every variety of diol which I have examined, particularly as far as oxypropylation goes, and usually to a mixed diol obtained by a combination of ethylene oxide and propylene oxide. The higher the temperature of reaction the greater this difference; the higher the speed of reaction usually the greater this difference. In other words, everything else being equal, the lower the temperature of reaction and the slower the speed of reaction, provided that no unreacted oxide remains behind, the more quickly the actual hydroxyl value will approach the theoretical. In addition to what has been said previously other procedures as illustrated by the following sixteen examples can be used but again it is purely a matter of choice and variation.

*Example 1a*

The diol employed was the glycidyl ether of tripropyleneglycol isopropyl ether. One mole of the monohydric ether was reacted in presence of 2% sodium methylate with one mole of glycide until the reaction was complete. The resultant product, as previously noted, is the glycidyl ether of tripropyleneglycol isopropyl ether. Its molecular weight is 308. The particular autoclave employed was one with a capacity of a little over 5 gallons or on the average of about 40 pounds of reaction mass. The speed of the stirrer could be varied from 150 to 350 R. P. M. 6⅛ pounds of the glycidyl ether, previously referred to, was charged into the autoclave along with .50 pound of sodium hydroxide. The reaction pot was flushed out with nitrogen. The autoclave was sealed and the automatic devices adjusted and set for injecting 23.20 pounds of propylene oxide in approximately 3 hours, with an allowance of another hour for stirring to insure completeness of reaction. The pressure regulator was set for a maximum of 35 pounds per square inch. This meant that the bulk of the reaction could take place, and probably did take place, at a comparatively low pressure. This comparatively low pressure was the result of the fact that considerable catalyst was present. The propylene oxide was added at the rate of about 8 pounds per hour. More important, the selected temperature range was 205° to 215° F. (about the boiling point of water). The initial introduction of propylene oxide was not started until the heating devices had raised the temperature to about the boiling point of water. At the completion of the reaction the molecular weight, based on the hydroxyl value determination, was 850 compared with a theoretical molecular weight of 1468. The final product was water-soluble, xylene-soluble, and somewhat dispersible in part in kerosene. However, the bulk of the product was kerosene-insoluble.

*Example 2a*

In this instance and in the next five examples (Examples 3a through 7a, inclusive) the autoclave used was a 15-gallon autoclave and not a 5-gallon autoclave. The equipment and design of the 15-gallon autoclave was the same as that of the 5-gallon autoclave.

The same procedure was employed as in Example 1a, preceding, as far as the initial reactant used and the amount of the initial reactant. The amount of catalyst added was 10 ounces. The time period was approximately 4 hours with an added hour for stirring. The conditions of temperature and pressure were the same as in Example 1a, preceding. The oxide (34.80 pounds) was added at about the same rate, about 8 pounds per hour, requiring a little over 4 hours, with a 45-minute stirring period afterwards.

The molecular weight, based on a hydroxyl determination, was 1125 compared with the theoretical molecular weight of 2048. The product was water-insoluble, xylene-soluble and kerosene-soluble. This statement applies also to the next six examples and will not be repeated.

Incidentally, the appearance of all these products varied from rather viscous, colorless or straw-colored compounds, to others having a distinct amber color. Those of the highest molecular weight would hardly flow at ordinary temperature, or at least were rather viscous. For convenience I have stored samples in wide-mouth cans. This applies to all the various samples herein described and this statement will, therefore, not be repeated.

*Example 3a*

The diol employed and the amount were identical with that described in Example 1a, preceding. The amount of catalyst employed was a little larger, to wit, 12 ounces. The amount of propylene oxide added was 46.4 pounds. The time period employed was 6 hours with an added hour for stirring. The conditions of temperature and pressure were the same as in the preceding examples and, as a matter of fact, apply to all subsequent examples in this series, i. e., Examples 4a through 8a, so this information will not be repeated.

The final product showed a molecular weight, based on hydroxyl number, of 1375 as compared with a theoretical molecular weight of 2628.

*Example 4a*

The diol employed and the amount were the same as in Example 1a, preceding. The amount of catalyst employed was a little less than one pound, i. e., 14 ounces. The amount of oxide added was 58 pounds. The time required to add the oxide was 7 hours with an added 1½ hours for stirring. At the end of the reaction the molecular weight, based on hydroxyl value, was 1685 compared with a theoretical molecular weight of 3208.

*Example 5a*

The same procedure was followed as in Example 4a, and the other preceding examples. The diol and amount employed were identical with that in Example 1a. The amount of catalyst employed was one pound. The amount of oxide added was 69 pounds. The time required to add the oxide was 10 hours, with 2 hours additional for stirring to insure completeness of reaction. The final product showed a molecular weight of 1820 on a hydroxyl value determination as compared with a theoretical molecular weight of slightly less than 3800 (3788).

*Example 6a*

The diol employed and the amount were the same as that used in Example 1a, preceding. The amount of caustic added as a catalyst was one pound. The amount of propylene oxide was 81.2 pounds. The time required to add the oxide was 12 hours. The reaction mass was stirred for 6 hours afterwards. The final product showed a molecular weight based on hydroxyl value of 2005 as compared with a theoretical molecular weight of 4368.

*Example 7a*

The diol employed and the amount was the same as in Example 1a. The amount of catalyst added was 1.25 pounds. The amount of oxide added was 92.8 pounds. The time required to add the oxide was 15 hours and stirring was continued for 5 hours afterwards to complete the reaction. The molecular weight of the final product, based on the hydroxyl value, was 2085 compared with 4950 theoretical molecular weight.

*Example 8a*

In this instance a 20-gallon autoclave similar in construction and equipment to the 5 and 15-gallon sizes previously described, was used. The only difference in this autoclave was that the lower third of the autoclave could be heated separately from the upper two-thirds by two entirely distinct electrical circuits. For this reason, only the lower heating circuit was used during the addition of the first one-fifth of propylene oxide (a little over 23 pounds). Thereafter, both circuits were employed and the autoclave was used as if the entire electrical heating system consisted of only one circuit.

The diol and amount employed were the same as in Example 1a. The amount of catalyst added was 1.50 pounds. The amount of oxide added was 116 pounds. The time required to add the oxide was 18 hours. The reaction mass was then stirred for 6 hours longer to insure completeness of reaction. The molecular weight of the final product, based on the hydroxyl value, was 2230 whereas the theoretical molecular weight was 6108.

*Example 9a*

The diol employed was the glycidyl ether of tripropyleneglycol N-butyl ether. One mole of the monohydric ether was reacted in presence of 2% sodium methylate with one mole of glycide until the reaction was complete. The resultant product, as previously noted, is the glycidyl ether of tripropylene glycol N-butyl ether. Its molecular weight was 322. The procedure employed, using the 5-gallon autoclave, was the same as in Example 1a, preceding. 6.45 pounds of the glycidyl ether previously referred to were charged into the autoclave, along with .50 pound of sodium hydroxide. From this point on the reaction was conducted in the same manner as in Example 1a, preceding. This applies to the time factor, the pressure factor, etc. The amount of oxide employed was the same as in Example 1a, to wit, 23.20 pounds. At the completion of the reaction the molecular weight based on the hydroxyl value determination was 900, compared with a theoretical molecular weight of 1482. The final product was water-soluble, xylene-soluble and somewhat dispersible in kerosene. However, the bulk of the product was kerosene-insoluble.

*Example 10a*

In this example, and in the next five examples (11a through 15a, inclusive), the autoclave used was the 15-gallon and not the 5-gallon autoclave. The equipment and design of this 15-gallon size was the same as that of the 5-gallon autoclave.

The same procedure was followed as in Examples 1a and 9a, preceding. The initial charge was identical with that employed in Example 9a. The amount of catalyst added was the same as in Example 2a, and the amount of propylene oxide used was the same as in Example 2a, namely 34.80 pounds. The time period, etc., was same as in Example 2a.

The molecular weight, based on hydroxyl determination, was 1150 compared with a theoretical molecular weight of 2062. The product was water-insoluble, xylene-soluble and kerosene-soluble. This statement applies to the next six examples and will not be repeated.

Incidentally, the appearance of all these products (Examples 9a through 16a) was the same as in the previous series of Examples 1a through 8a, inclusive.

*Example 11a*

The diol employed and amount was identical with that described in Example 9a. The amount of catalyst employed was 12 ounces. The amount of propylene oxide added was the same as that employed in Example 3a, preceding, i. e., 46.4 pounds. The time period was 6 hours with an added hour for stirring. The conditions of temperature and pressure were the same as in preceding examples and, as a matter of fact, applies to all subsequent examples in this series, i. e., Examples 12a through 16a, inclusive, so this information will not be repeated.

The final product showed a molecular weight, based on hydroxyl number, of 1335 as compared to a theoretical molecular weight of 2642.

*Example 12a*

The diol employed and the amount was the same as in Example 9a, preceding. The amount of catalyst employed was 14 ounces. The amount of oxide added was the same as in Example 4a, i. e., 58 pounds. The time factor was the same as in Example 4a, preceding. At the end of the reaction time the molecular weight, based on hydroxyl number, was 1670 compared with a theoretical molecular weight of 3222.

*Example 13a*

The same procedure was followed as in the preceding examples. The diol and amount employed was identical with that in Example 9a. The amount of catalyst used was one pound. The amount of propylene oxide added was 69 pounds. The time of addition, etc., was the same as in Example 5a, preceding. The final product showed a molecular weight of 1845 based on hydroxyl value, as compared with a theoretical molecular weight of 3802.

*Example 14a*

The diol employed and the amount were the same as in Example 9a, preceding. The amount of caustic added as a catalyst was one pound. The amount of propylene oxide was 81.2 pounds. The time factor was the same as in Example 6a, preceding. The final product showed a molecular weight of 2015 based on hydroxyl value, as compared with theoretical molecular weight of 4382.

*Example 15a*

The diol employed and the amount was the same as in Example 9a. The amount of catalyst added was 1.25 pounds. The amount of oxide added was 92.8 pounds. The reaction was conducted as far as time period goes in the same manner as described in Example 7a, preceding. The molecular weight of the final product, based on the hydroxyl value, was 2100 as compared with the theoretical molecular weight of 4962.

*Example 16a*

In this instance a 20-gallon autoclave, similar in construction and equipment to the 5-gallon and 15-gallon sizes previously described, was used. The only difference in this autoclave was that the lower third of the autoclave could be heated separately from the upper two-thirds by two entirely distinct electrical circuits. For this reason, only the lower heating circuit was used during the addition of the first one-fifth of the propylene oxide (a little over 23 pounds). Thereafter both circuits were employed and the autoclave was used as if the entire electrical heating system consisted of only one circuit.

The diol and amount employed was the same as in Example 9a, preceding. The amount of catalyst employed 1.50 pounds. The amount of oxide added was 116 pounds. The time required to add the oxide was 18 hours. The reaction mass was stirred for 6 hours longer to insure completeness of reaction. This is substantially the same time period as used in Example 8a, preceding. The molecular weight of the final product was 2210, based on the hydroxyl value, and the theoretical molecular weight was 6122.

Numerous other examples have been treated in the same manner with propylene oxide. Such examples were obtained by treating alcohols of the kind described, particularly water-soluble aliphatic alcohols, with several moles of ethylene oxide or several moles of propylene oxide, or a mixture of the two oxides so as to obtain a polypropylene glycol methyl, ethyl, isopropyl, or butyl ether, as the case happened to be, or to obtain a polyethyleneglycol ether of the same kind. In all instances such monohydric glycol ethers were then treated with glycide mole for mole in presence of a small amount of alkaline catalyst. The diol ether so obtained was then subjected to oxypropylation in the manner illustrated in Examples 1a through 16a, preceding.

The solubility of these products varied somewhat but in each instance water-insoluble and kerosene-soluble products were obtained of actual molecular weights of 1,000 or in excess thereof, such as 1200, 1300, 1400, or thereabouts.

Speaking of insolubility in water or solubility in kerosene such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecular weights exceed 2,000. In some instances the acetyl value or hydroxyl value serves as satisfactorily as an index to the molecular weight as any other procedure, subject to the above limitations, and especially in the higher molecular weight range. If any difficulty is encountered in the manufacture of the esters as described in Part 2 the stoichiometrical amount of acid or acid compound should be taken which corresponds to the indicated acetyl or hydroxyl value. This matter has been discussed in the literature and is a matter of common knowledge and requires no further elaboration. In fact, it is illustrated by some of the examples appearing in the patent previously mentioned.

PART 2

As previously pointed out the present invention is concerned with acidic esters obtained from the oxypropylated derivatives described in Part 1, immediately preceding, and polycarboxy acids, particularly dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from reactants such as maleic anhydride and cyclopentadiene. Such acids should be heat stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950, to De Groote and Keiser, and particularly with one more opening to permit the use of a porous spreader if hydrochloric acid gas is to be used as a catalyst. Such device or absorption spreader consists of minute alundum thimbles which are connected to a glass tube. One can add a sulfonic acid such as para-toluene sulfonic acid as a catalyst. There is some objection to this because in some instances there is some evidence that this acid catalyst tends to decompose or rearrange oxypropylated compounds, and particularly likely to do so if the esterification temperature is too high. In the case of polycarboxy acids such as diglycollic acid, which is strongly acidic there is no need to add any catalyst. The use of hydrochloric gas has one advantage over para-toluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever and to insure complete dryness of the diol as described in the final procedure just preceding Table 1.

The products obtained in Part 1 preceding may contain a basic catalyst. As a general procedure I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 1 is then diluted further with sufficient xylene decalin, petroleum solvent, or the like, so that one has obtained approximately a 65% solution. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear somewhat viscous straw-colored amber liquid so obtained may contain a small amount of sodium sulfate or sodium chloride but, in any event, is perfectly acceptable for esterification in the manner described.

It is to be pointed out that the products here described are not polyesters in the sense that there is a plurality of both diol radicals and acid radicals; the product is characterized by having only one diol radical.

In some instances and, in fact, in many instances I have found that in spite of the dehydration methods employed above that a mere trace of water still comes through and that this mere trace of water certainly interferes with the acetyl or hydroxyl value determination, at least when a number of conventional procedures are used and may retard esterification, particularly where there is no sulfonic acid or hydrochloric acid present as a catalyst. Therefore, I have preferred to use the following procedure: I have employed about 200 grams of the diol as described in Part 1, preceding; I have added about 60 grams of benzene, and then refluxed this mixture in the glass resin pot using a phase-separating trap until the benzene carried out all the water present as water of solution or the equivalent. Ordinarily this refluxing temperature is apt to be in the neighborhood of 130° to possibly 150° C. When all this water or moisture has been removed I also withdraw approximately 20 grams or a little less benzene and then add the required amount of the carboxy reactant and also about 150 grams of a high boiling aromatic petroleum solvent. These solvents are sold by various oil refineries and, as far as solvent effect act as if they were almost completely aromatic in character. Typical distillation data in the particular type I have employed and found very satisfactory is the following:

| | |
|---|---|
| I. B. P., 142° C. | 50 ml., 242° C. |
| 5 ml., 200° C. | 55 ml., 244° C. |
| 10 ml., 209° C. | 60 ml., 248° C. |
| 15 ml., 215° C. | 65 ml., 252° C. |
| 20 ml., 216° C. | 70 ml., 252° C. |
| 25 ml., 220° C. | 75 ml., 260° C. |
| 30 ml., 225° C. | 80 ml., 264° C. |
| 35 ml., 230° C. | 85 ml., 270° C. |
| 40 ml., 234° C. | 90 ml., 280° C. |
| 45 ml., 237° C. | 95 ml., 307° C. |

After this material is added, refluxing is continued and, of course, is at a high temperature, to wit, about 160° to 170° C. If the carboxy reactant is an anhydride needless to say no water of reaction appears; if the carboxy reactant is an acid water of reaction should appear and should be eliminated at the above reaction temperature. If it is not eliminated I simply separate out another 10 or 20 cc. of benzene by means of the phase-separating trap and thus raise the temperature to 180° or 190° C., or even to 200° C., if need be. My preference is not to go above 200° C.

The use of such solvent is extremely satisfactory provided one does not attempt to remove the solvent subsequently except by vacuum distillation and provided there is no objection to a little residue. Actually, when these materials are used for a purpose such as demulsification the solvent might just as well be allowed to remain. If the solvent is to be removed by distillation, and particularly vacuum distillation, then the high boiling aromatic petroleum solvent might well be replaced by some more expensive solvent, such as decalin or an alkylated decalin which has a rather definite or close range boiling point. The removal of the solvent, of course, is purely a conventional procedure and requires no elaboration.

In the appended table Solvent #7–3, which appears in all instances, is a mixture of 7 volumes of the aromatic petroleum solvent previously described and 3 volumes of benzene. This was used, or a similar mixture, in the manner previously described. In a large number of similar examples decalin has been used but it is my preference to use the above mentioned mixture and particularly with the preliminary step of removing all the water. If one does not intend to remove the solvent my preference is to use the petroleum solvent-benzene mixture although obviously any of the other mixtures, such as decalin and xylene, can be employed.

The data included in the subsequent tables, i. e., Tables 1 and 2, are self-explanatory, and very complete and it is believed no further elaboration is necessary:

TABLE 1

| Ex. No. of Acid Ester | Ex. No. of Hydroxy Compound | Mol. Wt. of Hydroxy Cmpd. by OH Determ. | Amount Hydroxy Compound Used (grs.) | Polycarboxy Reactant | Amt. Used (grs.) |
|---|---|---|---|---|---|
| 1b | 2a | 1,125 | 225 | Adipic Acid | 58 |
| 2b | 2a | 1,125 | 225 | Phthalic Anhydride | 59 |
| 3b | 2a | 1,125 | 225 | Succinic Anhydride | 40 |
| 4b | 2a | 1,125 | 225 | Azelaic Acid | 75 |
| 5b | 2a | 1,125 | 225 | Diglycollic Acid | 54 |
| 6b | 2a | 1,125 | 225 | Aconitic Acid | 70 |
| 7b | 3a | 1,375 | 275 | Adipic Acid | 58 |
| 8b | 3a | 1,375 | 275 | Phthalic Anhydride | 59 |
| 9b | 3a | 1,375 | 275 | Succinic Anhydride | 40 |
| 10b | 3a | 1,375 | 275 | Azelaic Acid | 75 |
| 11b | 3a | 1,375 | 275 | Diglycollic Acid | 54 |
| 12b | 3a | 1,375 | 275 | Aconitic Acid | 70 |
| 13b | 4a | 1,685 | 281 | Adipic Acid | 48 |
| 14b | 4a | 1,685 | 281 | Phthalic Anhydride | 49 |
| 15b | 4a | 1,685 | 281 | Succinic Anhydride | 33 |
| 16b | 4a | 1,685 | 281 | Azelaic Acid | 63 |
| 17b | 4a | 1,685 | 281 | Diglycollic Acid | 45 |
| 18b | 4a | 1,685 | 281 | Aconitic Acid | 58 |
| 19b | 5a | 1,820 | 182 | Adipic Acid | 29 |
| 20b | 5a | 1,820 | 182 | Phthalic Anhydride | 30 |
| 21b | 5a | 1,820 | 182 | Succinic Anhydride | 20 |
| 22b | 5a | 1,820 | 182 | Azelaic Acid | 38 |
| 23b | 5a | 1,820 | 182 | Diglycollic Acid | 27 |
| 24b | 5a | 1,820 | 182 | Aconitic Acid | 35 |
| 25b | 6a | 2,005 | 200 | Adipic Acid | 29 |
| 26b | 6a | 2,005 | 200 | Phthalic Anhydride | 30 |
| 27b | 6a | 2,005 | 200 | Succinic Anhydride | 20 |
| 28b | 6a | 2,005 | 200 | Azelaic Acid | 38 |
| 29b | 6a | 2,005 | 200 | Diglycollic Acid | 27 |
| 30b | 6a | 2,005 | 200 | Aconitic Acid | 35 |
| 31b | 7a | 2,085 | 208 | Adipic Acid | 29 |
| 32b | 7a | 2,085 | 208 | Phthalic Anhydride | 30 |
| 33b | 7a | 2,085 | 208 | Succinic Anhydride | 20 |
| 34b | 7a | 2,085 | 208 | Azelaic Acid | 38 |
| 35b | 7a | 2,085 | 208 | Diglycollic Acid | 27 |
| 36b | 7a | 2,085 | 208 | Aconitic Acid | 35 |
| 37b | 8a | 2,230 | 223 | Adipic Acid | 29 |
| 38b | 8a | 2,230 | 223 | Phthalic Anhydride | 30 |
| 39b | 8a | 2,230 | 223 | Succinic Anhydride | 20 |
| 40b | 8a | 2,230 | 223 | Azelaic Acid | 38 |
| 41b | 8a | 2,230 | 223 | Diglycollic Acid | 27 |
| 42b | 8a | 2,230 | 223 | Aconitic Acid | 35 |

TABLE 2

| Ex. No. of Ester | Solvent | Amt. Solvent (grs.) | Esterification Temp., °C. | Time of Esterification (hrs.) | Water Out (cc.) |
|---|---|---|---|---|---|
| 1b | #7–3 | 289 | 169 | 4½ | 8.1 |
| 2b | #7–3 | 278 | 145 | 3½ | None |
| 3b | #7–3 | 260 | 150 | 5½ | None |
| 4b | #7–3 | 285 | 168 | 6½ | 6.2 |
| 5b | #7–3 | 260 | 155 | 2 | 9.0 |
| 6b | #7–3 | 253 | 158 | 3½ | 6.8 |
| 7b | #7–3 | 258 | 160 | 3½ | 9.0 |
| 8b | #7–3 | 240 | 144 | 1½ | None |
| 9b | #7–3 | 236 | 148 | 1¼ | None |
| 10b | #7–3 | 275 | 167 | 5¾ | 8.5 |
| 11b | #7–3 | 248 | 155 | 2¾ | 8.3 |
| 12b | #7–3 | 266 | 156 | 3 | 7.8 |
| 13b | #7–3 | 265 | 158 | 4½ | 6.0 |
| 14b | #7–3 | 238 | 147 | 2 | None |
| 15b | #7–3 | 244 | 146 | 2 | None |
| 16b | #7–3 | 273 | 168 | 5 | 5.8 |
| 17b | #7–3 | 262 | 157 | 3½ | 5.7 |
| 18b | #7–3 | 270 | 149 | 2 | 6.3 |
| 19b | #7–3 | 240 | 160 | 3½ | None |
| 20b | #7–3 | 235 | 156 | 1¼ | None |
| 21b | #7–3 | 245 | 148 | 4 | 4.3 |
| 22b | #7–3 | 288 | 166 | 6¼ | 5.0 |
| 23b | #7–3 | 252 | 158 | 3 | 3.9 |
| 24b | #7–3 | 232 | 144 | 4¼ | 2.6 |
| 25b | #7–3 | 256 | 150 | 5 | 4.0 |
| 26b | #7–3 | 230 | 145 | 1 | None |
| 27b | #7–3 | 241 | 150 | 1¼ | None |
| 28b | #7–3 | 275 | 165 | 4¾ | 4.6 |
| 29b | #7–3 | 266 | 159 | 3½ | 3.8 |
| 30b | #7–3 | 270 | 163 | 2¾ | 2.7 |
| 31b | #7–3 | 258 | 156 | 4¼ | 2.4 |
| 32b | #7–3 | 236 | 154 | 1¾ | None |
| 33b | #7–3 | 235 | 149 | 2 | None |
| 34b | #7–3 | 282 | 168 | 5½ | 2.9 |
| 35b | #7–3 | 277 | 152 | 4 | 2.9 |
| 36b | #7–3 | 266 | 157 | 3 | 3.9 |
| 37b | #7–3 | 254 | 160 | 4¾ | 2.7 |
| 38b | #7–3 | 242 | 155 | 1½ | None |
| 39b | #7–3 | 238 | 148 | 1¾ | None |
| 40b | #7–3 | 278 | 164 | 4 | 2.4 |
| 41b | #7–3 | 260 | 150 | 2¾ | 3.0 |
| 42b | #7–3 | 258 | 152 | 3 | 2.6 |

The procedure for manufacturing the esters has been illustrated by preceding examples. If for any reason reaction does not take place in a manner that is acceptable, attention should be directed to the following details: (a) Recheck the hydroxyl or acetyl value of the oxypropylated glycerol ether and use a stoichiometrically equivalent amount of acid; (b) if the reaction does not proceed with reasonable speed either raise the temperature indicated or else extend the period of time up to 12 or 16 hours if need be; (c) if necessary, use ½% of paratoluene sulfonic acid or some other acid as a catalyst; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal as the size of the molecule increases the reactive hydroxyl radical represents a smaller fraction of the entire molecule and thus more difficulty is involved in obtaining complete esterification.

Even under the most carefully controlled conditions of oxypropylation involving comparatively low temperatures and long time of reaction there are formed certain compounds whose compositions are still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant for the reason that apparently under conditions of reaction less reactive hydroxyl radicals are present than indicated by the hydroxyl value. Under such circumstances there is simply a residue of the carboxylic reactant which can be removed by filtration or, if desired, the esterification procedure can be repeated using an appropriately reduced ratio of carboxylic reactant.

Even the determination of the hydroxyl value and conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation and particularly vacuum distillation. The final products or liquids are generally pale amber to amber in color, and show moderate viscosity. They can be bleached with bleaching clays, filtering chars, and the like. However, for the purpose of demulsification or the like color is not a factor and decolorization is not justified.

In the above instances I have permitted the solvents to remain present in the final reaction mass. In other instances I have followed the same procedure using decalin or a mixture of decalin or benzene in the same manner and ultimately removed all the solvents by vacuum distillation. Appearances of the final products are much the same as the diols before esterification and in some instances were somewhat darker in color and had a reddish cast and perhaps somewhat more viscous.

PART 3

Previous reference has been made to the fact that diols such as polypropyleneglycol of approximately 2,000 molecular weight, for example, have been esterified with dicarboxy acids and employed as demulsifying agents. On first examination the difference between the herein described products and such comparable products appears to be rather insignificant. In fact, the difference is such that it fails to explain the fact that compounds of the kind herein described may be, and frequently are, 10%, 15% or 20% better on a quantitative basis than the simpler compound previously described, and demulsify faster and give cleaner oil in many instances. The method of making such comparative tests has been described in a booklet entitled "Treating Oil Field Emulsions," used in the Vocational Training Course, Petroleum Industry Series, of the American Petroleum Institute.

The difference, of course, does not reside in the carboxy acid but in the diol. Momentarily an effort will be made to emphasize certain things in regard to the structure of a polypropylene glycol, such as polypropylene glycol of a 2000 molecular weight. Propylene glycol has a primary alcohol radical and a secondary alcohol radical. In this sense the building unit which forms polypropylene glycols is not symmetrical. Obviously, then, polypropylene glycols can be obtained, at least theoretically, in which two secondary alcohol groups are united or a secondary alcohol group is united to a primary alcohol group, etherization being involved, of course, in each instance.

Usually no effort is made to differentiate between oxypropylation taking place, for example, at the primary alcohol unit radical or the secondary alcohol radical. Actually, when such products are obtained, such as a high molal polypropylene glycol or the products obtained in the manner herein described one does not obtain a single derivative such as $HO(RO)_nH$ in which $n$ has one and only one value, for instance, 14, 15 or 16, or the like. Rather, one obtains a cogeneric mixture of closely related or touching homologues. These materials invariably have high molecular weights and cannot be separated from one another by any known procedure without decomposition. The properties of such mixture represent the contribution of the various individual members of the mixture. On a statistical basis, of course, $n$ can be appropriately specified. For practical purposes one need only consider the oxypropylation of a monohydric alcohol because in essence this is substantially the mechanism involved. Even in such instances where one is concerned with a monohydric reactant one cannot draw a single formula and say that by following such procedure one can readily obtain 80% or 90% or 100% of such compound. However, in the case of at least monohydric initial reactants one can readily draw the formulas of a large number of compounds which appear in some of the probable mixtures or can be prepared as components and mixtures which are manufactured conventionally.

Simply by way of illustration reference is made to the co-pending application of De Groote, Wirtel and Pettingill, Serial No. 109,791, filed August 11, 1949 (now Patent No. 2,549,434, dated April 17, 1951).

However, momentarily referring again to a monohydric initial reactant it is obvious that if one selects any such simple hydroxylated compound and subjects such compound to oxyalkylation, such as oxyethylation, or oxypropylation, it becomes obvious that one is really producing a polymer of the alkylene oxides except for the terminal group. This is particularly true where the amount of oxide added is comparatively large, for instance, 10, 20, 30, 40, or 50 units. If such compound is subjected to oxyethylation so as to introduce 30 units of ethylene oxide, it is well known that one does not obtain a single constituent which, for the sake of convenience, may be indicated as $RO(C_2H_4O)_{30}H$. Instead, one obtains a cogeneric mixture of closely related homologues, in which the formula may be shown as the following, $RO(C_2H_4O)_nH$, wherein $n$, as far as the statistical average goes, is 30, but the individual members present in significant amount may vary from instances where $n$ has a value of 25, and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental principles of condensation polymerization," by Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description, or else consider the value of $n$, in formulas such as those which have appeared previously and which appear in the claims, as representing both individual constituents in which $n$ has a single definite value, and also with the understanding that $n$ represents the average statistical value based on the assumption of completeness of reaction.

This may be illustrated as follows: Assume that in any particular example the molal ratio of the propylene oxide to the diol is 15 to 1. Actually, one obtains products in which $n$ probably varies from 10 to 20, perhaps even further. The average value, however, is 15, assuming, as previously stated, that the reaction is complete. The product described by the formula is best described also in terms of method of manufacture.

However, in the instant situation it becomes obvious that if an ordinary high molal propyleneglycol is compared to strings of white beads of various lengths, the diols herein employed as intermediates are characterized by the presence of a black bead, i. e., a radical which corresponds to a dihydroxylated glycerol ether as previously described, that is, for example the radical

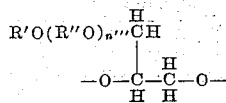

in which the various characters have their previous significance. Furthermore, it becomes obvious that one now has a nonsymmetrical radical in the majority of cases for the reason that in the cogeneric mixture going back to the corresponding formula

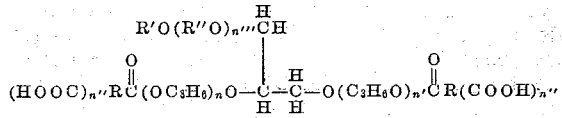

$n$ and $n'$ are usually not equal. For instance, if one introduces 15 moles of propylene oxide, $n$ and $n'$ could not be equal, insofar that the nearest approach to equality is where the value of $n'$ is 7 and $n$ is 8. However, even in the case of an even number such as 20, 30, 40 or 50, it is also obvious that $n$ and $n'$ will not be equal in light of what has been said previously. Both sides of the molecule are not going to grow with equal rapidity, i.e., to the same size. Thus the diol herein employed is differentiated from polypropylene diol 2000, for example, in that $(a)$ it carries a hereto unit, i. e., a unit other than a propylene glycol or propylene oxide unit, $(b)$ such unit is off center, and $(c)$ the effect of that unit, of course, must have some effect in the range with which the linear molecules can be drawn together by hydrogen binding or van der Waals forces, or whatever else may be involved.

What has been said previously can be emphasized in the following manner. It has been pointed out previously that in the last formula immediately preceding, $n$ or $n'$ could be zero. Under the conditions of manufacture as described in Part 1 it is extremely unlikely that $n$ is ever zero. However, such compounds can be prepared readily with comparatively little difficulty by resorting to a blocking effect or reaction. For instance, if the dihydroxylated glycerol ether is esterified with a low molal acid such as acetic acid mole for mole and such product subjected to oxyalkylation using a catalyst, such as sodium methylate and guarding against the presence of any water, it becomes evident that all the propylene oxide introduced, for instance 15 to 80 molecules per polyhydric alcohol molecule necessarily must enter at one side only. If such product is then saponified so as to decompose the acetic acid ester and then acidified so as to liberate the water-soluble acetic acid and the water-insoluble diol a separation can be made and such diol then subjected to esterification as described in Part 2, preceding. Such esters, of course, actually represent products where either $n$ or $n'$ is zero. Also intermediate procedures can be employed, i. e., following the same esterification step after partial oxypropylation. For instance, one might oxypropylate with one-half the ultimate amount of propylene oxide to be used and then stop the reaction. One could then convert this partial oxypropylated intermediate into an ester by reaction of one mole of acetic acid with one mole of a diol. This ester could then be oxypropylated with all the remaining propylene oxide. The final product so obtained could be saponified and acidified so as to eliminate the water-soluble acetic acid and free the obviously unsymmetrical diol which, incidentally, should also be kerosene-soluble.

From a practical standpoint I have found no advance in going to this extra step but it does emphasize the difference in structure between the herein described diols employed as intermediates and high molal polypropylene glycol, such as polypropylene glycol 2000.

PART 4

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000 or 1 to 50,000 as in desalting practice, such an apparent insolubility in oil and water is not significant because said reagents undoubtedly have solubility within such concentrations. This same fact is true in regard to the material or materials employed as the demulsifying agent of my process.

In practicing my process for revolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and reintroduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation.

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels' to 2000 barrels' capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 29b with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier.

PART 5

Previous reference has been made to other oxyalkylating agents other than propylene oxide, such as ethylene oxide. Obviously variants can be prepared which do not depart from what is said herein but do produce modifications. The diol derived by etherization of glycerol in the manner described can be reacted with ethylene oxide in modest amounts and then subjected to oxypropylation provided that the resultant derivative is (a) water-insoluble, (b) kerosene-soluble, and (c) has present 15 to 80 alkylene oxide radicals. Needless to say, in order to have water-insolubility and kerosene-solubility the large majority must be propylene oxide. Other variants suggest themselves as, for example, replacing propylene oxide by butylene oxide.

More specifically then one mole of such etherized glycerol of the kind described can be treated with 2, 4 or 6 moles of ethylene oxide and then treated with propylene oxide so as to produce a water-insoluble, kerosene-soluble diol in which there are present 15 to 80 oxide radicals as previously specified. Similarly the propylene oxide can be added first and then the ethylene oxide, or random oxyalkylation can be employed using a mixture of the two oxides. The compounds so obtained are readily esterified in the same manner as described in Part 2, preceding. Incidentally, the diols described in Part 1 or the modifications described therein can be treated with various reactants such as glycide, epichlorohydrin, dimethyl sulfate, sulfuric acid, maleic anhydride, ethylene imine, etc. If treated with epichlorohydrin or monochloroacetic acid the resultant product can be further reacted with a tertiary amine such as pyridine, or the like, to give quaternary ammonium compounds. If treated with maleic anhydride to give a total ester the resultant can be treated with sodium bisulfite to yield a sulfosuccinate. Sulfo groups can be introduced also by means of a sulfating agent as previously suggested, or by treating the chloroacetic acid resultant with sodium sulfite.

I have found that if such hydroxylated compound or compounds are reacted further so as to produce entirely new derivatives, such new derivatives have the properties of the original hydroxylated compounds insofar that they are effective and valuable demulsifying agents for resolution of water-in-oil emulsions as found in the petroleum industry, as break inducers in doctor treatment of sour crude, etc.

Having thus described my invention, what I claim as new and desire to secure by Letters Patent, is

1. A process for breaking petroleum emulsions of the water-in-oil type characterized by subjecting the emulsion to the action of a demulsifier including hydrophile synthetic products; said hydrophile synthetic products being characterized by the following formula:

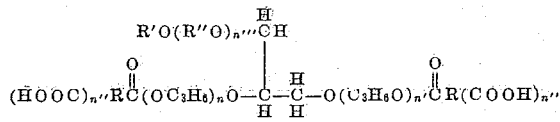

in which $n$ and $n'$ are numerals including zero, and $n'''$ is a small whole number less than 10, with the proviso that $n$ plus $n'$ plus $n'''$ equals a sum varying from 15 to 80 and $n''$ is a whole number not over 2; $R''$ is an alkylene radical having 2 to 3 carbon atoms; $R'$ is a hydrocarbon radical having less than 8 carbon atoms, and R is a radical of the polycarboxy acid

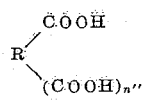

in which $n''$ has its previous significance; and with the further proviso that the parent diol prior to esterification be water-insoluble and kerosene-soluble.

2. A process for breaking petroleum emulsions of the water-in-oil type characterized by subjecting the emulsion to the action of a demulsifier including hydrophile synthetic products; said hydrophile synthetic products being characterized by the following formula:

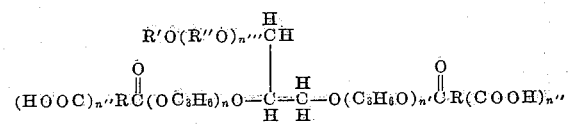

in which $n$ and $n'$ are numerals including zero, and $n'''$ is a small whole number less than 10, with the proviso that $n$ plus $n'$ plus $n'''$ equals a sum varying from 15 to 80 and $n''$ is a whole number not over 2; $R''$ is an alkylene radical having 2 to 3 carbon atoms; $R'$ is a hydrocarbon radical having less than 8 carbon atoms, and R is a radical of the polycarboxy acid

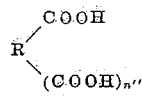

in which $n''$ has its previous significance; said polycarboxy acid having not more than 8 carbon atoms; and with the further proviso that the parent diol prior to esterification be water-insoluble and kerosene-soluble.

3. A process for breaking petroleum emulsions of the water-in-oil type characterized by subjecting the emulsion to the action of a demulifier including hydrophile synthetic products; said hydrophile synthetic products being characterized by the following formula:

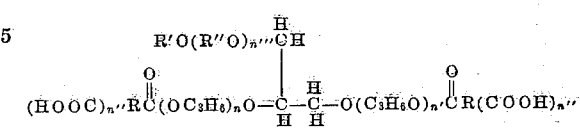

in which $n$ and $n'$ are numerals excluding zero and $n'''$ is a small whole number less than 10, with the proviso that $n$ plus $n'$ plus $n'''$ equals a sum varying from 15 to 80 and $n''$ is a whole number not over 2; $R''$ is an alkylene radical having 2 to 3 carbon atoms, $R'$ is a hydrocarbon radical having less than 8 carbon atoms, and R is a radical of the polycarboxy acid $$R\begin{matrix}\diagup COOH\\ \diagdown (COOH)_{n''}\end{matrix}$$

in which $n''$ has its previous significance; said polycarboxy acid having not more than 8 carbon atoms; and with the further proviso that the parent diol prior to esterification be water-insoluble and kerosene-soluble.

4. A process for breaking petroleum emulsions of the water-in-oil type characterized by subjecting the emulsion to the action of a demulsifier including hydrophile synthetic products; said hydrophile synthetic products being characterized by the following formula:

$$\underset{H\ H}{(HOOC)R\overset{O}{\overset{\|}{C}}(OC_3H_6)_nO-\overset{H}{\underset{H}{C}}-\overset{R'O(R''O)_{n'''}\overset{H}{C}H}{\underset{}{C}}-O(C_3H_6O)_{n'}\overset{O}{\overset{\|}{C}}R(COOH)}$$

in which $n$ and $n'$ are numerals excluding zero, and $n'''$ is a small whole number less than 10, with the proviso that $n$ plus $n'$ plus $n'''$ equals a sum varying from 15 to 80; R'' is an alkylene radical having 2 to 3 carbon atoms; R' is a hydrocarbon radical having less than 8 carbon atoms, and R is a radical of the dicarboxy acid $$R\begin{matrix}\diagup COOH\\ \diagdown COOH\end{matrix}$$

said dicarboxy acid having not more than 8 carbon atoms; and with the further proviso that the parent diol prior to esterification be water-insoluble and kerosene-soluble.

5. The process of claim 4 wherein R' has at least 3 carbon atoms.

6. The process of claim 4 wherein R' has at least 3 carbon atoms and is derived from a water-soluble alcohol.

7. The process of claim 4 wherein R' has at least 3 carbon atoms, is derived from a water-soluble alcohol, and the dicarboxy acid is phthalic acid.

8. The process of claim 4 wherein R' has at least 3 carbon atoms, is derived from a water-soluble alcohol, and the dicarboxy acid is maleic acid.

9. The process of claim 4 wherein R' has at least 3 carbon atoms, is derived from a water-soluble alcohol, and the dicarboxy acid succinic acid.

10. The process of claim 4 wherein R' has at least 3 carbon atoms, is derived from a water-soluble alcohol, and the dicarboxy acid is citraconic acid.

11. The process of claim 4 wherein R' has at least 3 carbon atoms, is derived from a water-soluble alcohol, and the dicarboxy acid is diglycollic acid.

MELVIN DE GROOTE.

REFERENCES CITED

The following references are of record in the file of this patent:

UNITED STATES PATENTS

| Number | Name | Date |
|---|---|---|
| 2,507,560 | De Groote et al. | May 16, 1950 |
| 2,514,399 | Kirkpatrick et al. | July 11, 1950 |
| 2,562,878 | Blair | Aug. 7, 1951 |